United States Patent
Boden

[19]

[11] Patent Number: 6,062,161

[45] Date of Patent: May 16, 2000

[54] VEHICLE ALARM APPARATUS

[76] Inventor: Robert O. Boden, 1580 Gaywood Dr., Altadena, Calif. 91001

[21] Appl. No.: 09/022,199

[22] Filed: Feb. 11, 1998

[51] Int. Cl.[7] .................................................... B60Q 11/00
[52] U.S. Cl. ........................ 116/28 A; 116/28 R; 340/347
[58] Field of Search ................................. 116/28 A, 28 R, 116/35 R, DIG. 1; 446/450, 451, 452; 340/435, 436, 437; 200/61.44

[56] References Cited

U.S. PATENT DOCUMENTS

| | | | |
|---|---|---|---|
| 1,709,400 | 4/1929 | Hess | 180/313 |
| 2,440,587 | 4/1948 | Krall | 200/61.44 |
| 2,464,365 | 3/1949 | Aves | 116/28 A |
| 2,768,255 | 10/1956 | Maddox | 200/61.44 |
| 2,902,671 | 9/1959 | Pitt | 340/437 |
| 5,032,822 | 7/1991 | Sweet | 340/443 |
| 5,520,045 | 5/1996 | Edri | 73/146 |

OTHER PUBLICATIONS

Photocopy of p. 27 of BMW's 1998 Brochure (No date).

Photocopies of both sides of a marketing card included with Deluxe–o–Matic Curb Indicators of Superior Industries, Van Nuys, California (No date).

Photocopy of Deluxe–o–Matic Curb Indicators of Superior Industries, Model No. 26–6441 (No date).

Primary Examiner—Diego Gutierrez
Assistant Examiner—R A Smith
Attorney, Agent, or Firm—Christie, Parker & Hale, LLP

[57] ABSTRACT

A vehicle alarm apparatus includes a frame mountable to a vehicle and defining a distal end spaced from the vehicle. A roller is rotatably mounted to the frame adjacent the distal end thereof to rotate upon coming into contact with a curb or other object. An alarm device is connected to the frame and is responsive to rotation of the roller to generate a warning signal.

18 Claims, 3 Drawing Sheets

VEHICLE ALARM APPARATUS

BACKGROUND OF THE INVENTION

1. Field of the Invention

The present invention relates to vehicle alarms for alerting a driver as a vehicle closely approaches a curb or other object, particularly in the course of parking the vehicle. More particularly, the present invention relates to such vehicle alarms that are actuated by coming into contact with the curb or other object.

2. Description of the Prior Art

Automobiles are becoming more and more expensive, and are viewed now more than ever as status symbols. Many people make vehicle purchasing decisions based almost entirely on aesthetic reasons rather than functional ones. As a result, many automobile owners desire to maintain their vehicles in prime condition, and will go to great lengths to keep them from being scratched, dented, or otherwise damaged. When a vehicle does happen to become damaged, the owner is faced with the prospect of spending large amounts of money to restore the vehicle's appearance.

One act that often results in costly and unsightly damage to vehicles is parking a vehicle on a street against a curb. As a vehicle approaches a curb, the vehicle body is often in the driver's line of sight and prevents the driver from seeing the curb. Thus, the driver typically must estimate the distance between the vehicle and the curb. If that estimate is inaccurate, a portion of the vehicle can impact the curb.

In addition, most cities have regulations that dictate a maximum allowable distance that a vehicle may be parked from a curb, forcing drivers to park relatively close to the curb. Parking close to the curb also reduces the risk of the vehicle being hit by a passing motorist. In attempting to park very close to a curb, however, driver error can cause significant damage to the vehicle, resulting in expensive repairs.

Parking space is quite limited in many highly populated or highly trafficked areas, forcing drivers to parallel park into very small spaces. For many drivers, parallel parking is a difficult task and often results in a tire, wheel, or other portion of the vehicle contacting with the curb, frequently with sufficient force to cause damage to the vehicle.

Others have attempted to design devices that alert motorists as the vehicle they are driving closely approaches a curb. One such prior art device comprises a curb feeler formed of a flexible metal arm attached to the metallic vehicle body to project outwardly from the vehicle a selected distance. As the feeler comes into contact with the curb, the feeler is vibrated and generates a scraping noise. The vibration resonates through the feeler body and into the metal vehicle structure, with the vehicle body acting as a sound board to amplify the noise to a level that can be heard by the driver. However, with many of today's vehicle bodies being made of materials other than metal, such as plastic and fiberglass, conventional metallic feelers do not work well on such vehicles. Plastic and fiberglass body panels do not provide a significant sound board effect, greatly reducing the noise created by contact between a metallic feeler and a curb.

Yet another prior art alarm device includes a system having a sonar emitter for emitting sonic and/or ultrasonic waves outwardly from the vehicle in a generally orthogonal direction to the vehicle body. A sonar detector is mounted to the vehicle to detect reflected waves and determine the distance between the vehicle and the object reflecting those waves. An indicator is mounted inside the vehicle to warn the driver that the vehicle is approaching the object. It will be appreciated that such systems can be quite expensive and normally must be built into the structure of an automobile at the time the automobile is manufactured. They are therefore not a practical solution for many vehicle owners.

Accordingly, there continues to be a need for a vehicle alarm device capable of reliably alerting an operator of a vehicle when the vehicle is within a preselected distance from a curb or other object. In addition, there continues to be a need for such a device that is relatively inexpensive and therefore a practical solution for any vehicle. The present invention addresses these needs and others.

SUMMARY OF THE INVENTION

Briefly, and in general terms, the present invention provides a reliable, inexpensive vehicle alarm apparatus for alerting the operator of a moving vehicle as the vehicle comes into close proximity to a curb or other object. The alarm apparatus includes a frame mounted to the vehicle and a roller rotatably mounted to the frame. As the roller comes into contact with a curb or other object, the roller rotates. An alarm device connected to the frame is responsive to rotation of the roller to generate a warning signal.

Thus, the vehicle alarm apparatus of the present invention in one preferred embodiment comprises: a frame including a proximal end mountable to the vehicle and a distal end spaced from the vehicle; a roller rotatably mounted to the frame adjacent the distal end thereof and operative to rotate upon contacting a curb or other object; and an alarm device connected to the frame and responsive to rotation of the roller to generate a warning signal.

In an alternative embodiment, the vehicle alarm apparatus to of the present invention incorporates a bell responsive to rotation of the roller to generate an audible warning signal.

In another embodiment, the vehicle alarm apparatus of the invention incorporates a transducer responsive to rotation of the roller to generate the warning signal in the form of an electrical signal.

Other features and advantages of the present invention will become apparent from the following detailed description, taken in conjunction with the accompanying drawings which illustrate, by way of example, the features of the present invention.

DESCRIPTION OF THE DRAWINGS

FIG. 2A is a fragmentary view of a portion of the vehicle alarm apparatus of FIG. 1, taken in the direction 2A—2A;

DETAILED DESCRIPTION OF THE PREFERRED EMBODIMENT

Figure 1:
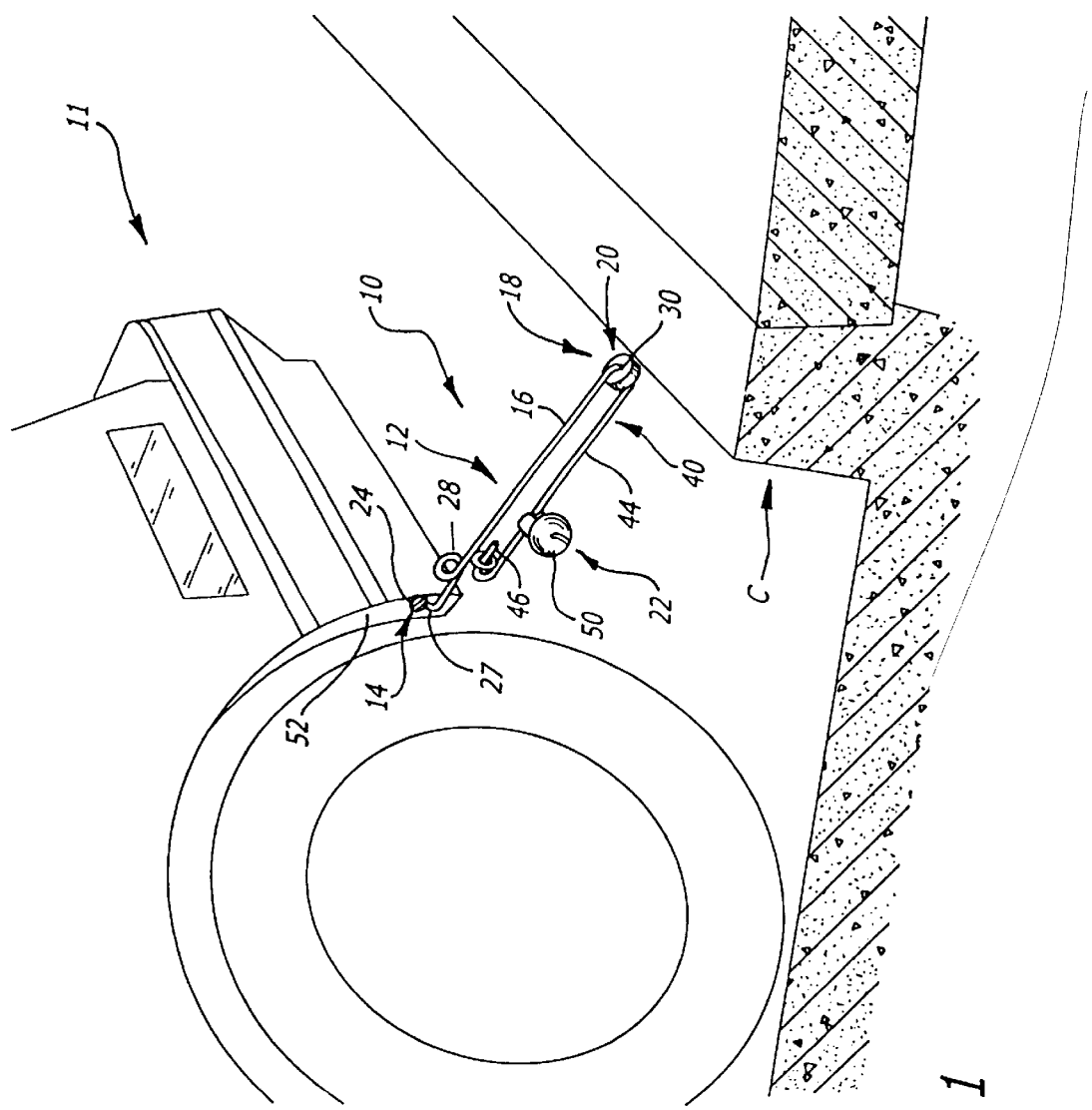
FIG. 1 is a perspective view of a vehicle alarm apparatus embodying the present invention and mounted to a vehicle.
Figure 2:
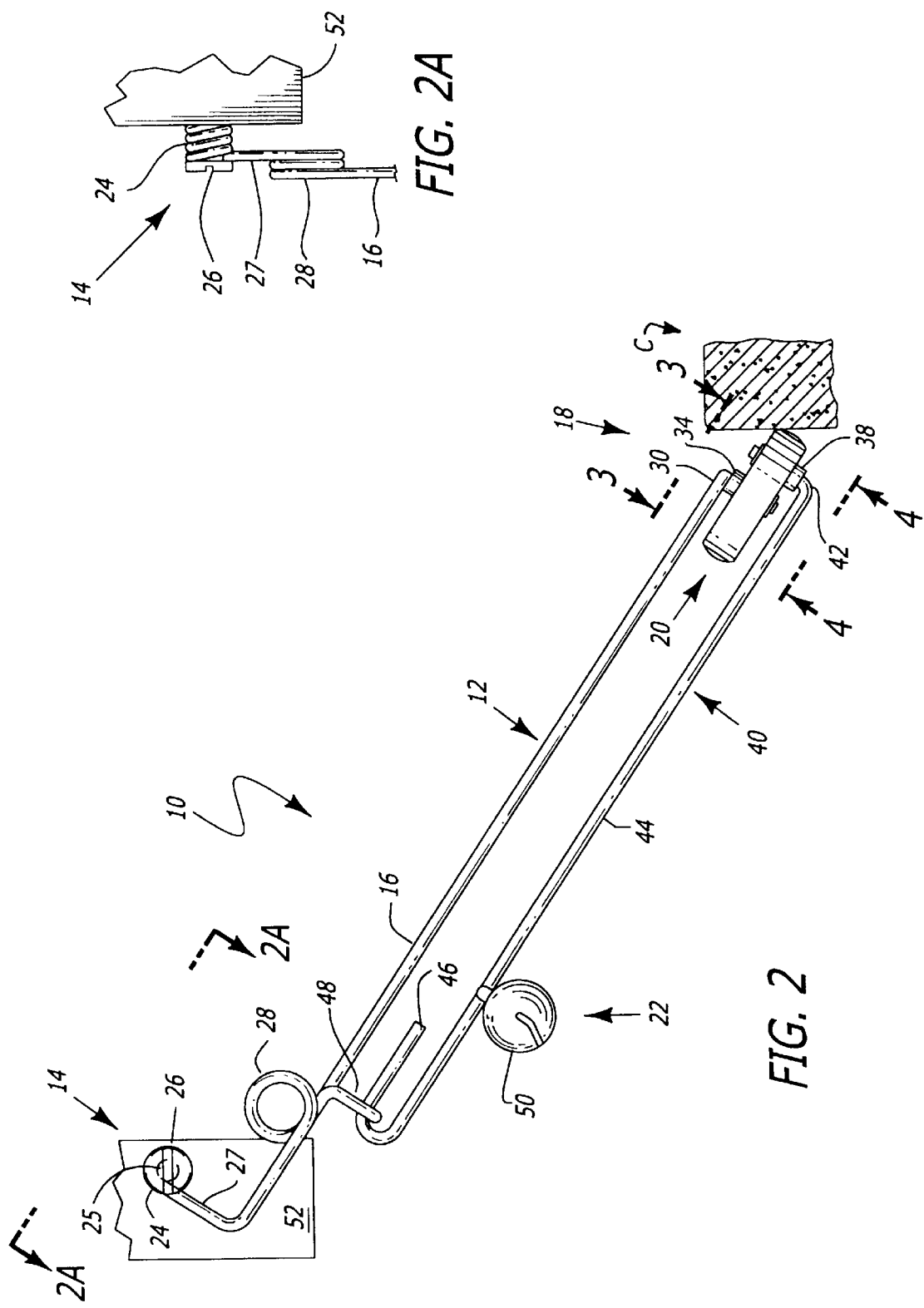
FIG. 2 is a rear elevational view, in enlarged scale, of the vehicle alarm apparatus of FIG. 1.

In the following detailed description, like reference numerals are used to refer to like or corresponding elements in the different figures of the drawings. Referring now to the drawings, and particularly to FIGS. 1 and 2, there is shown, generally, a vehicle alarm apparatus 10 comprising one preferred embodiment of the present invention adapted for mounting to a wheel well 52 or other location on a vehicle 11. The vehicle alarm apparatus comprises, generally, a frame 12 including a proximal end 14 and a flexible, resilient arm 16 defining a distal end 18 of the frame. A roller, generally designated 20, is rotatably mounted to the frame adjacent the distal end thereof and is operative to rotate when it contacts and moves along the surface of an object such as a curb C. An alarm device, generally designated 22, is mounted to the frame and is responsive to rotation of the roller to generate a warning signal.

The frame 12 is preferably formed at the proximal end 14 thereof into a coil segment 24 defining a central opening 25 sized for receipt of a shank and threaded portion of a mounting screw 26 therethrough. The coil segment preferably has a longitudinal length selected so that with the mounting screw extending therethrough and threadedly engaging a mounting bore (not shown) of the vehicle 11, the coil will be at least partially compressed. In the compressed state, the coil exerts an axial force against the head of the mounting screw in a direction away from the vehicle. As a result, the threads of the mounting screw are forced axially against the threads of the bore in the vehicle to lock the mounting screw in place and positively resist loosening of the mounting screw.

In the embodiment disclosed, the frame 12 further includes a straight wire segment 27 projecting from one end of the coil segment 24. The straight wire segment is connected to a spring portion 28 comprising a plurality of turns of wire spaced closely together, and the spring portion, in turn, connects to the elongated, flexible arm 16. The spring portion allows the flexible arm to be flexed away from its normally straight, unaltered configuration while simultaneously urging the arm back to that unaltered configuration.

The flexible, resilient arm 16 is in the form of a straight wire segment and preferably has a longitudinal length of between approximately six and twelve inches. It will be understood, however, that the arm may be formed having virtually any length to accommodate different needs. The distal end of the arm is preferably provided with downwardly projecting segment 30 to mount the roller, as described in greater detail below.

The frame 12 is preferably formed of one piece of wire shaped to form the coil segment 24, the spring portion 28, and the mounting segment 30. The frame may be formed of stainless steel wire or other suitable metal wire that is elastic and therefore resilient, and also capable of being deformed when bent beyond its elastic limit for shaping as described above.

Referring to FIGS. 1 through 4, there is shown the roller 20. In the embodiment shown, the roller is in the form of a generally cylindrical wheel having a transversely curved periphery to ensure positive engagement with the curb C (FIG. 2). It will be understood, however, that the roller can take many different forms, such as a spherical ball, a barrel-shaped roller, or other such structures that include a circular cross-sectional region to permit rolling of the roller across the surface of an object.

Figure 3:
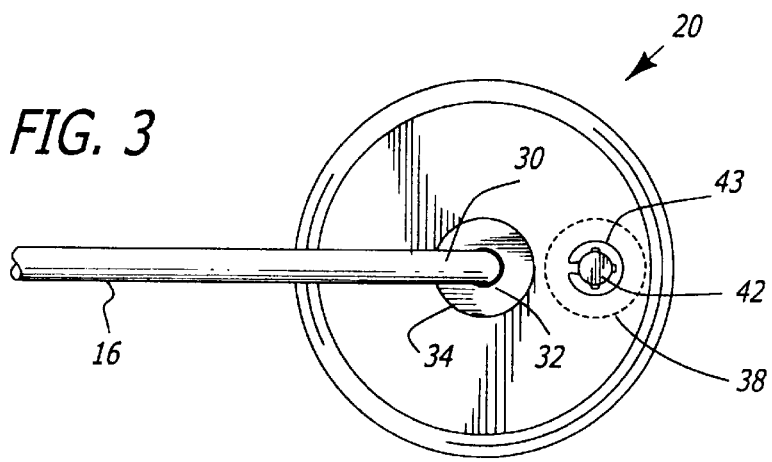
FIG. 3 is a fragmented top plan view, in enlarged scale, taken in the direction 3—3 of FIG. 2.
Figure 4:
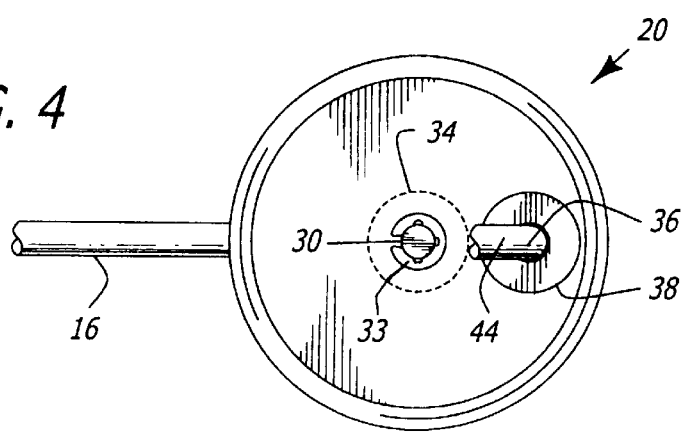
FIG. 4 is a fragmented bottom plan view, in enlarged scale, taken in the direction 4—4 of FIG. 2.

The roller 20 has formed centrally therein a through bore 32 for receipt of the mounting segment 30 (FIGS. 3 and 4). The bottom end of the mounting segment is configured for tight fitting engagement with a snap ring 33 or other annular shaped ring (such as a metallic eyelet molded in place) having a diameter larger than that of the through bore to prevent withdrawal of the mounting segment from the through bore and thereby ensure engagement of the roller and the frame. The roller has, on its upper surface, a boss 34 aligned with the through bore (FIGS. 2 and 3).

The roller 20 also has an eccentrically disposed through bore 36 (FIG. 4) and an eccentric boss 38 formed on the bottom surface of the roller in registration with the eccentric bore (FIGS. 2 and 4). The boss may preferably be formed with a frustoconically shaped opening as described in greater detail below.

Referring to FIGS. 1 and 2, the frame 12 further includes an actuator arm, generally designated 40, comprising an upwardly projecting mounting segment 42 sized for extension through the eccentric bore 36 and boss 38. A snap ring 43 or other similar component (such as an eyelet) is engaged with the end of the mounting segment to maintain the mounting segment in place within the eccentric bore.

The actuator arm 40 further includes an elongated arm segment 44 connected at one end to the mounting segment 42 and a turned-back segment 46 at the other end of the elongated arm segment, the turned-back segment slidably extending through a ring 48 connected to the flexible, resilient arm 16 to support the actuator arm. Due to the eccentric mounting of the actuator arm to the roller 20, rotation of the roller causes the actuator arm to reciprocate with the turned-back segment loosely confined within the ring 48 and sliding relative to it.

In the embodiment disclosed, the actuator arm 40 has connected thereto the alarm device 22. In that first embodiment, the alarm device is in the form of a bell 50 securely mounted to the actuator arm. Thus, as the actuator arm reciprocates, the bell is shaken and as a result generates a warning signal in the form of an audible ringing to alert the driver of the vehicle. It will be understood that the alarm device could be some other form of audible device responsive to reciprocal -movement to create an audible noise.

It will be apparent that the respective bosses 34 and 38 maintain the straight portions of the resilient arm 16 and actuator arm 40 spaced sufficiently far from the roller such that the respective arms do not come into contact with either of the mounting segments 30 or 42 projecting from the roller 20 as the roller rotates.

In use, one or more vehicle alarm apparatuses 10 may be mounted to a vehicle. For vehicles having wheel well trim, this can be accomplished by removing one of the screws holding the metal trim in place, preferably the screw closest to the surface of the road. The vehicle alarm apparatus is then positioned so that the coil segment 24 is aligned with the exposed threaded hole in the wheel well 52. The mounting screw 26 is inserted through the coil segment and threadedly engaged with the threaded hole to mount the vehicle alarm apparatus to the vehicle. Alternatively, the user may drill a hole in the wheel well or other desirable location on the vehicle, preferably about six inches above the ground, and mount the vehicle alarm apparatus in that manner.

The vehicle alarm apparatus 10 is preferably mounted on the vehicle 11 at an angle relative to the horizontal (FIG. 2) so that the roller 20 is disposed below the upper end of a conventional curb C for engagement therewith.

During operation of the vehicle, as the driver proceeds generally parallel to a curb or other object and prepares to parallel park the vehicle, he or she may roll down one or both of the right side windows in order to hear the bell or other alarm device 22 more easily. If the roller 20 should come into contact with the curb and rotate as a result, the actuator arm reciprocates, causing the bell to ring and thereby alert the driver. The driver may then maneuver the vehicle accordingly to ensure that the vehicle does not hit the curb. If the driver continues to approach the curb, the resilient arm 16 is deflected while the roller is maintained in contact with the curb. The vehicle alarm apparatus still works as the resilient arm is simply flexed away from its normal, unaltered shape. Once the vehicle moves away from the curb, the spring portion 28 and the resilience of the arm cause it to return to its unaltered shape.

Figure 5:
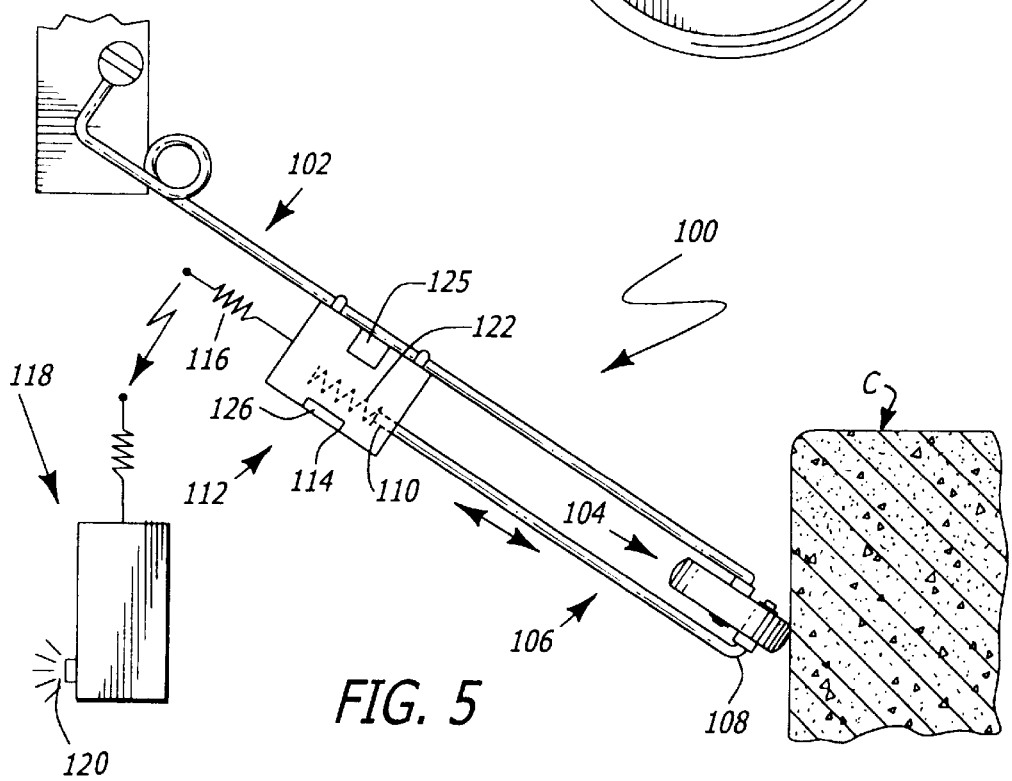
FIG. 5 is a rear elevational view of a second embodiment of the vehicle alarm apparatus of the present invention.

Referring to FIG. 5, another embodiment of the vehicle alarm apparatus 100 of the present invention comprises a frame, generally designated 102, and a roller 104 rotatably mounted to the frame, which are identical to the frame 12 and the roller 20 of the first embodiment. The vehicle alarm apparatus also includes an actuator arm 106 having a first end 108 eccentrically mounted to the roller 104 and a free second end 110. An alarm device 112 connected to the frame takes the form of a transducer 114 in communication with the free second end of the actuator arm. The transducer is responsive to reciprocal movement of the actuator arm to generate a warning signal in the form of an electrical signal. That electrical signal may be conducted to a transmitter unit housed inside the transducer and converted and transmitted as an electromagnetic signal via an antenna 116 to an antenna 117 of a detector device in the form of a receiver 118 mounted on or inside the vehicle. The receiver may include an indicator, such as an LED 120 or audible signal generator such as a buzzer (not shown), that is responsive to receipt of the electromagnetic signal to generate an audible or optical alarm signal. Alternatively, the electrical signal generated by the transducer 114 can be transmitted via an electrical wire directly to an LED or the like mounted inside the vehicle (not shown).

It will be understood by those skilled in the art that many different types of transducers can be utilized in the vehicle alarm apparatus 100. One suitable form of transducer is a magnetic sensor, for example an inductive pickup coil, comprising a conductor 122 in the form of a coil mounted on the free second end 110 of the actuator arm 106. The inductive pickup coil further comprises a pair of spaced apart magnets 124 and 126 of opposing polarity that create a magnetic flux therebetween. The magnets are disposed at predetermined locations so that the coil is interposed therebetween for travel at a right angle to the generated magnetic flux. As the coil is moved relative to the magnets during rotation of the roller 104, a voltage is induced in the coil. The coil is electrically connected at both ends to a suitable non-modulating transmitter circuit, which preferably includes the dipole antenna 116, an amplifier (not shown), and a power source such as a battery (not shown). The receiver 118 includes the dipole antenna 117, an amplifier (not shown), the LED 120 or other alarm device, and a power supply such as a battery or a plug that can be inserted into the vehicle's cigarette outlet.

From the foregoing, it will be appreciated that the vehicle alarm apparatus 10 of the present invention provides a reliable, relatively inexpensive device for alerting the driver of a vehicle when the vehicle is in close proximity to a curb or other object. In addition, the present invention includes an alarm apparatus that may take many different forms.

While several forms of the invention have been described, it will be apparent to those skilled in the art that various modifications and improvements may be made without departing from the spirit and scope of the invention. As such, it is not intended that the invention be limited, except as by the appended claims.

I claim:

1. A vehicle alarm apparatus mountable to a vehicle for generating a warning signal when the vehicle travels generally parallel to an object and within a preselected distance therefrom, said alarm apparatus comprising:

a frame including a proximal end mountable to the vehicle and a distal end to be spaced from the vehicle;

a roller rotatably mounted to the frame adjacent the distal end thereof and operative to rotate upon contacting the object as the vehicle travels; and an alarm device eccentrically connected to said roller and responsive to rotation of the roller so that rotation of said roller causes said alarm device to generate said warning signal.

2. The vehicle alarm apparatus of claim 1 wherein:

said frame further includes a spring portion between the proximal end and the distal end for urging the distal end to an unaltered position when the distal end is flexed away from the unaltered position.

3. The vehicle alarm apparatus of claim 1 wherein:

said alarm device comprises a bell responsive to rotation of the roller to generate said warning signal, wherein said warning signal comprises an audible signal.

4. The vehicle alarm apparatus of claim 1 wherein:

said frame includes a coil portion disposed at the proximal end of said frame and having a central passage for reception of a mounting screw for mounting the frame to the vehicle, said coil being operative to lock said screw in place to resist loosening of said mounting screw.

5. The vehicle alarm apparatus of claim 1 wherein said alarm device comprises:

a transducer mounted on said frame and responsive to rotation of said roller to generate said warning signal; and a detector device for mounting on the vehicle, in communication with the transducer, and responsive to receipt of the warning signal to generate an alarm signal.

6. The vehicle alarm apparatus of claim 1 wherein:

said frame is dimensioned for spacing said distal end between approximately six and twelve inches from said vehicle.

7. The vehicle alarm apparatus of claim 1 wherein:

said alarm device comprises a transducer responsive to rotation of the roller to generate said warning signal, wherein said warning signal is in the form of an electrical signal; and said alarm device further includes an indicator for mounting on the vehicle and electrically connected to the transducer and responsive to receipt of said electrical signal to generate an alarm signal.

8. The vehicle alarm apparatus of claim 1 wherein:

said frame includes an actuator arm eccentrically connected to the roller to reciprocate as the roller rotates; and said alarm device is connected to the actuator arm.

9. The vehicle alarm apparatus of claim 8 wherein:

said frame further includes a ring disposed at a predetermined location thereon; and said actuator arm includes a free end extending through said ring and supported therein for free movement of the actuator arm relative to the ring.

10. A vehicle alarm apparatus for alerting an operator when a moving vehicle is within a preselected distance from an object, said alarm apparatus comprising:

a frame including a proximal end mountable on said vehicle, a flexible, resilient arm defining a distal end of said frame, and a spring portion interposed between said proximal end and said arm;

a roller rotatably mounted on said frame adjacent said distal end for contacting the object as the vehicle moves; and an alarm device eccentrically connected to said roller and responsive to rotation of said roller so that rotation of said roller causes said alarm device to generate a warning signal.

11. The vehicle alarm apparatus of claim 10 wherein:

said alarm device comprises a bell responsive to rotation of said roller to generate said warning signal, wherein said warning signal comprises an audible signal.

12. The vehicle alarm apparatus of claim 10 wherein:

said frame includes a coil disposed at the proximal end of said frame and having a central passage for reception of a mounting screw for mounting the frame to said vehicle, said coil serving to lock said screw in place to resist loosening of said mounting screw.

13. The vehicle alarm apparatus of claim 10 wherein said alarm apparatus comprises:

a transducer mounted on said frame and responsive to rotation of said roller to generate said warning signal; and a detector device for mounting on the vehicle, in communication with the transducer, and responsive to receipt of the warning signal to generate an alarm signal.

14. The vehicle alarm apparatus of claim 10 wherein:

said frame is dimensioned for spacing said distal end between approximately six and twelve inches from said vehicle.

15. The vehicle alarm apparatus of claim 10 wherein said alarm device comprises:

a transducer responsive to rotation of the roller to generate said warning signal, wherein said warning signal is in the form of an electrical signal; and an indicator for mounting on the vehicle and electrically connected to the transducer and responsive to receipt of said electrical signal to generate an alarm signal.

16. The vehicle alarm apparatus of claim 10 wherein:

said frame includes an actuator arm eccentrically connected to the roller to reciprocate as the roller rotates; and said alarm device is connected to the actuator arm.

17. The vehicle alarm apparatus of claim 16 wherein:

said frame further includes a ring disposed at a predetermined location thereon; and said actuator arm includes a free end extending through said ring and supported therein for free movement of the actuator arm relative to the ring.

18. A vehicle curb alarm apparatus for alerting an operator of the vehicle when the moving vehicle is within a predetermined distance from a curb, said alarm apparatus comprising:

a frame including a coil portion defining a proximal end of said frame, a flexible, resilient arm defining a distal end of said frame, and a spring portion interposed between the arm and the coil portion;

a roller rotatably mounted to the distal end of said arm for contacting the curb as the vehicle moves;

an actuator arm including a first end eccentrically connected to said roller and responsive to rotation of said roller to travel along a reciprocating path; and a bell connected to said actuator arm for generating an audible signal when said actuator arm reciprocates.

* * * * *